2,192,251

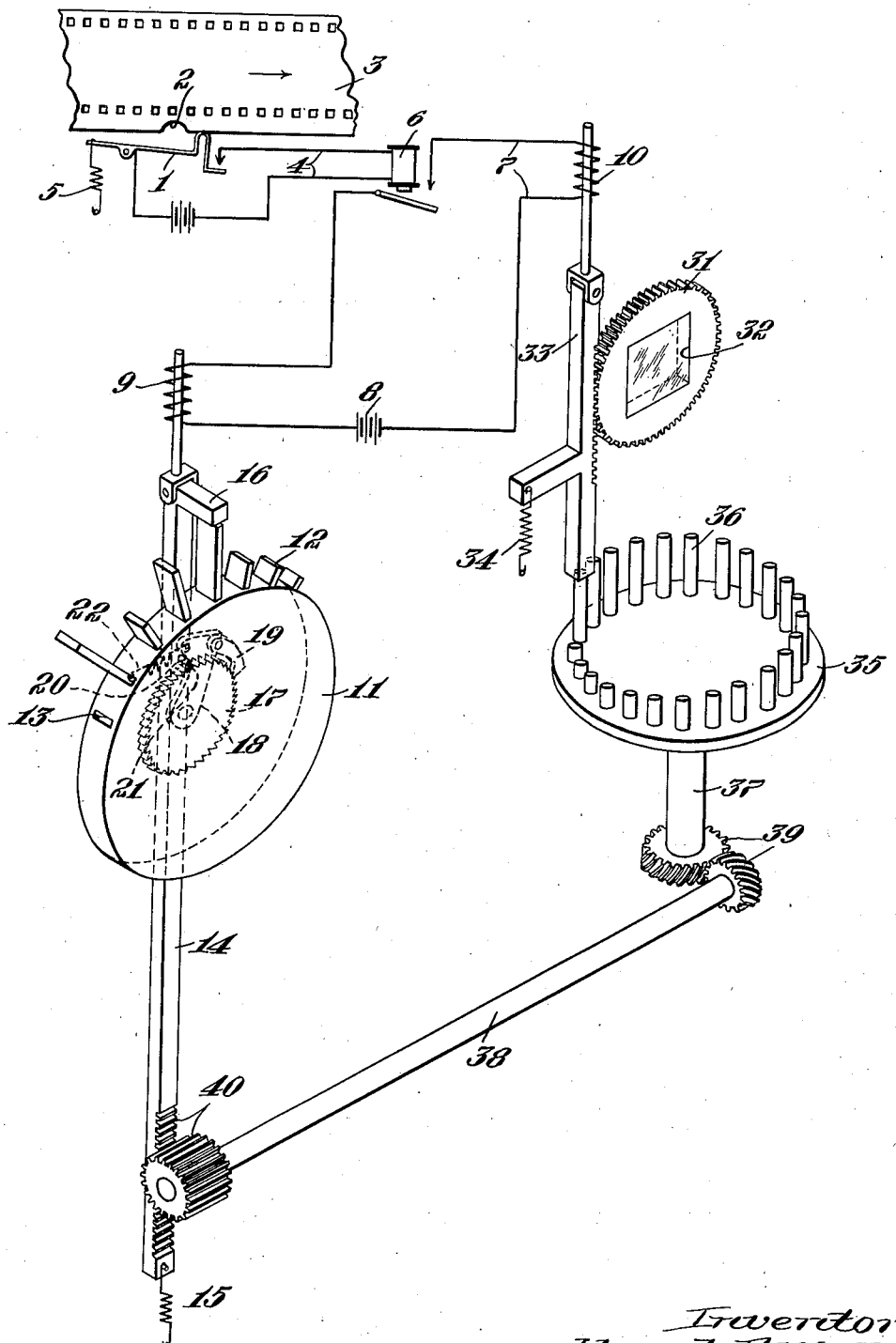
March 5, 1940.  L. E. WHITTAKER  2,192,251
RESETTING APPARATUS
Filed March 11, 1939
Inventor
Lloyd E. Whittaker Patented Mar. 5, 1940

UNITED STATES PATENT OFFICE 2,192,251

RESETTING APPARATUS

Lloyed E. Whittaker, Los Angeles, Calif., assignor to Technicolor Motion Picture Corporation, Los Angeles, Calif., a corporation of Maine Application March 11, 1939, Serial No. 261,339

8 Claims. (Cl. 74—1)

In machines of various kinds it is often desirable to reset an element periodically. For example, in printing motion pictures, it is necessary to vary the intensity of the printing light from time to time depending upon the densities of the negatives of successive scenes. Objects of the present invention are to provide an apparatus and method by which the adjustments or variations may be made accurately and by which the degree of adjustment or the order of adjustment or both may be quickly varied throughout wide limits without loss of accuracy.

According to this invention the element to be adjusted from time to time is responsive to a controller having backward and forward movement and a controller gauge having a series of stops of different values successively movable into the path of the controller to limit the forward movement different degrees respectively. The controller is retracted and advanced in response to periodic impulses of suitable character, such as electrical impulses produced by an ordinary circuit closer. The controller gauge is moved to a new position while the controller is retracted, preferably in direct response to the movement of the controller near the rear end of the movement, thereby to permit the controller to return to a new stop of different limiting value. Means responsive to said return then moves the aforesaid element to a new position corresponding to the limiting value of said new stop. The aforesaid means preferably includes as actuator having backward and forward movement for actuating said element and an actuator gauge having a series of stops of different values successively movable into the path of the actuator to limit its forward movement different degrees respectively, each successive stop having a lesser limiting value. The extent of each movement of the actuator gauge corresponds to the extent of the forward movement of the aforesaid controller. While the controller may govern the movement of the actuator gauge in various ways the preferred way comprises a direct mechanical connection between the two so that the actuator gauge advances a distance corresponding to the distance the controller advances from its retracted position, which depends upon the limiting value of the new stop brought into the path of the controller while the controller is retracted.

By making the controller stops adjustable, successive adjustments of the actuator gauge may be of any desired degree and any desired order. For example, the controller stops may be set to move the actuator gauge either large or small steps or alternately large and small steps, successively in the same direction or alternately in opposite directions, etc. By making the actuator stops in the form of permanent fixed abutments they control the actuator more accurately than adjustable stops. Thus the controller stops afford the required adjustability to bring the actuator gauge successively to new positions in any desired order and to any desired extent and the actuator stops afford a high degree of accuracy in bringing the actuator to new positions successively.

For the purpose of illustration a typical embodiment of the invention is shown in the accompanying drawing which comprises a diagrammatic view of mechanism for controlling the intensity of light in a cinematographic printer by moving a polarizing element back and forth as disclosed in the companion application of Joseph A. Ball, Serial No. 261,404 filed March 13, 1939.

The particular embodiment of the invention chosen for the purpose of illustration comprises an electric switch 1 controlled in the usual way by notches in the edge of the negative film 3. As shown in the figure the switch is normally held in open position by engagement with the edge of the film but closes the circuit 4 when it moves into the notch 2 under the influence of the spring 5. Connected to the circuit 4 is a relay 6 which controls the circuit 7 containing a source of current 8 and two solenoids 9 and 10. These solenoids respectively operate the aforesaid controller and actuator mechanisms.

The controller mechanism comprises a gauge in the form of a rotary disk 11 having adjustable stops 12 mounted in succession around its periphery. In the illustration the stops are in the form of bars 12 of different lengths fitting into slots 13 in the periphery of the disk sufficiently snugly not to drop out accidentally. From the foregoing it will be understood that these stops of different lengths may be mounted in the slots 13 in any desired sequence. In the vertical axial plane of the disk 11 is a vertically reciprocating controller 14 which is normally held in lowered or advance position by a spring 15 and which may be lifted to upper or retracted position by energization of the solenoid 9. Mounted on the side of the controller 14 is an arm 16 adapted to engage the end of that one of the stops 12 which is positioned in the aforesaid plane. Fast to the side of the disk 11 is a ratchet wheel 17 for rotating the disk 11 step by step to bring successive stops into operative position. Pivotally mounted at the center of the ratchet wheel is an arm 18 carrying a pawl 19 engageable with the ratchet teeth. The arm 18 has a cam surface 20 engageable with a pin 21 projecting from the controller 14, the cam surface being held against the pin by a spring 22. Thus, when the solenoid 9 lifts the controller 14 the pin 21 moves the arm 18 in a clockwise direction, thereby causing the pawl 19 to advance the ratchet wheel 17 far enough to bring the next succeeding stop 12 in line with the arm 16. Then, when the solenoid 9 is deenergized, the spring 15 advances the controller until the arm 16 engages the end of the new stop, thereby limiting the forward movement of the controller to a degree depending upon the length of the new stop.

The actuator mechanism comprises a pinion 31 having a window 32 in which is mounted the polarizer as described in the aforesaid companion application. Meshing with the pinion 31 is a vertically reciprocating actuator 33 which is normally held in lowered or advanced position by means of a spring 34, the actuator being retracted by the solenoid 10. Below the actuator 33 is a gauge in the form of a disk 35 which rotates about a vertical axis and which carries on its upper surface a circular row of stop pins 36, the pins being graduated in height and moving successively into alignment with the actuator 33. Extending downwardly from the disk 35 is a shaft 37 connected to shaft 38 through gears 39, the shaft 38 also being connected to the controller 14 through a rack and pinion 40. The stops 12 differ in length by an integral multiple of an amount which, with a particular correlated gear ratio between controller 14 and shaft 37, corresponds to the distance between the pins 36, whereby the disk 35 always stops in such a position that one of the pins 36 is in line with the actuator 33. Thus, with twenty-two pins 36 there should be twenty-two stops 12 differing in lengths by equal steps.

The operation of the apparatus is as follows. When a notch 2 passes the switch 1, relay 6 is energized simultaneously to energize solenoids 9 and 10, thereby lifting the controller 14 and the actuator 33 to their fully retracted positions in which the arm 16 clears the longest stop 12 and the actuator 33 clears the longest pin 36. During the latter portion of the retracting movement of the controller 14 the pawl 19 rotates the ratchet 17 to advance the disk 11 one step. The retraction of the controller 14 also rotates the disk 35 in a clockwise direction somewhat more than enough to bring the longest pin 36 into alignment with the actuator 33. When the solenoid 9 is deenergized the spring 15 advances the controller 14 until the arm 16 engages the end of the new stop 12. As the controller 14 is advanced the disk 35 is rotated in a counterclockwise direction an extent depending upon the length of the new stop 12, thereby bringing into alignment with the actuator 33 a new pin 36 corresponding in length to the length of the new stop 12. Thus, the actuator 33 is permitted to advance to an extent depending upon the length of the new stop 12. By making the pins 36 successively of shorter lengths the actuator 33 can drop from pin to pin as the disk 35 rotates in a counterclockwise direction. However, the parts are preferably so timed that the actuator 33 does not engage a pin until the gauge comes substantially to rest in its new position. The advance of the actuator 33 can be made to lag behind the advance of the controller 14 in various ways, as for example, by relative adjustment of the springs 15 and 34 or the use of a device which retards the advance of the actuator 33 without retarding its retraction. Conversely, the actuator 33 should retract somewhat more rapidly than the controller 14 to prevent the lower end of the actuator interfering with the pins 36 as the disk 35 rotates in a clockwise direction. This can easily be accomplished either by making the solenoid 10 somewhat stronger than the solenoid 9 or by making the actuator 33 somewhat lighter than the controller 14 or both.

From the foregoing it will be evident that this new apparatus and method affords adjustment or variation of the element 31 (or any other element) which is accurate and which may be quickly and easily varied by varying the lengths or limiting values of the stops 12. By making the stops 36 rigid instead of adjustable they serve to control the position of the actuator 33 with a high degree of accuracy even though the adjustable stops 12 are not made accurately or are not positioned accurately in the disk 11.

It should be understood that the present disclosure is for the purpose of illustration only and that this invention includes all modifications and equivalents which fall within the scope of the appended claims.

I claim:

1. Apparatus for successively resetting a mechanical element in response to periodic impulses, comprising a controller having backward and forward movement, a controller gauge having a series of stops of different values successively movable into the path of the controller to limit said forward movement different degrees respectively, means responsive to said impulses for retracting and advancing said controller, means for moving said controller gauge to a new position while the controller is retracted, thereby to permit the controller to return to a new stop of different limiting value, and means responsive to said return to move said element to a new position corresponding to the limiting value of said new stop.

2. Apparatus for successively resetting a mechanical element in response to periodic impulses, comprising a controller having backward and forward movement, a controller gauge having a series of stops of different values successively movable into the path of the controller to limit said forward movement different degrees respectively, means for changing the limiting values of the respective stops to reset said element to any desired extent and in any desired order, means responsive to said impulses for retracting and advancing said controller, means for moving said controller gauge to a new position while the controller is retracted, thereby to permit the controller to return to a new stop of different limiting value, and means responsive to said return to move said element to a new position corresponding to the limiting value of said new stop.

3. Apparatus for successively resetting a mechanical element in response to periodic impulses, comprising a controller having backward and forward movement, a controller gauge having a series of stops of different values successively movable into the path of the controller to limit said forward movement different degrees respectively, an actuator having backward and forward movement for actuating said element, an actuator gauge movable to different positions to limit the forward movement of said actuator different degrees, means responsive to said impulses for retracting and advancing said controller and actuator, means for moving said controller gauge to a new position while the controller is retracted, thereby to permit the controller to return to a new stop of different limiting value, and means responsive to said return to move the actuator gauge to a new position corresponding to the limiting value of said new stop, thereby to permit said actuator to return to a new position corresponding to the limiting value of the new stop.

4. Apparatus for successively resetting a mechanical element in response to periodic impulses, comprising a controller having backward and forward movement, a controller gauge having a series of stops of different values successively movable into the path of the controller to limit said forward movement different degrees respectively, an actuator having backward and forward movement for actuating said element, an actuator gauge having a series of stops of different values successively movable into the path of the actuator to limit its forward movement different degrees respectively, each successive stop of the actuator gauge having a lesser limiting value, means responsive to said impulses for retracting and advancing said controller and actuator, means for moving said controller gauge to a new position while the controller is retracted, thereby to permit the controller to return to a new stop of different limiting value, and means movable in proportion to the forward movement of the controller for moving the actuator gauge to a new position corresponding to the limiting value of said new stop, thereby to permit said actuator to return to a new position corresponding to the limiting value of the new stop.

5. Apparatus for successively resetting a mechanical element in response to periodic impulses, comprising a controller having backward and forward movement, a controller gauge having a series of stops of different values successively movable into the path of the controller to limit said forward movement different degrees respectively, an actuator having backward and forward movement for actuating said element, an actuator gauge having a series of stops of different values successively movable into the path of the actuator to limit its forward movement different degrees respectively, the limiting values of successive controller stops varying irregularly and the limiting values of successive actuator stops varying regularly, means responsive to said impulses for retracting and advancing said controller and actuator, means for moving said controller gauge to a new position while the controller is retracted, thereby to permit the controller to return to a new stop of different limiting value, and means movable in proportion to the forward movement of the controller for moving the actuator gauge to a new position corresponding to the limiting value of said new stop, thereby to permit said actuator to return to a new position corresponding to the limiting value of the new stop.

6. Apparatus for successively resetting a mechanical element in response to periodic impulses, comprising a controller having backward and forward movement, a controller gauge having a series of interchangeable stops of different approximate values successively movable into the path of the controller to limit said forward movement different degrees respectively, an actuator having backward and forward movement for actuating said element, an actuator gauge having a series of fixed stops of different accurate values successively movable to different positions to limit the forward movement of said actuator different degrees, means responsive to said impulses for retracting and advancing said controller and actuator, means for moving said controller gauge to a new position while the controller is retracted, thereby to permit the controller to return to a new stop of different limiting value, and means responsive to said return to move the actuator gauge to a new position corresponding to the limiting value of said new stop, thereby to permit said actuator to return accurately to a new position corresponding to the approximate value of the new stop.

7. Apparatus for successively resetting a mechanical element in response to periodic impulses, comprising a controller having backward and forward movement, a controller gauge having a series of interchangeable stops of different approximate values successively movable into the path of the controller to limit said forward movement different degrees respectively, an actuator having backward and forward movement for actuating said element, an actuator gauge having a series of stops of different accurate values successively movable into the path of the actuator to limit its forward movement different degrees respectively, each successive stop of the actuator gauge having a lesser limiting value, means responsive to said impulses for retracting and advancing said controller gauge to a new position while the controller is retracted, thereby to permit the controller to return to a new stop of different limiting value, and means movable in proportion to the forward movement of the controller for moving the actuator gauge to a new position corresponding to the limiting value of said new stop, thereby to permit said actuator to return accurately to a new position corresponding to the approximate value of the new stop.

8. Apparatus for successively resetting a mechanical element in response to periodic impulses, comprising a controller having backward and forward movement, a controller gauge having a series of interchangeable stops of different approximate values successively movable into the path of the controller to limit said forward movement different degrees respectively, an actuator having backward and forward movement for actuating said element, an actuator gauge having a series of stops of different accurate values successively movable into the path of the actuator to limit its forward movement different degrees respectively, the limiting values of successive controller stops varying irregularly and the limiting values of successive actuator stops varying regularly, means responsive to said impulses for retracting and advancing said controller and actuator, means for moving said controller gauge to a new position while the controller is retracted, thereby to permit the controller to return to a new stop of different limiting value, and means movable in proportion to the forward movement of the controller for moving the actuator gauge to a new position corresponding to the limiting value of said new stop, thereby to permit said actuator to return accurately to a new position corresponding to the approximate value of the new stop.

LLOYED E. WHITTAKER.